United States Patent
Lee et al.

(10) Patent No.: US 7,212,664 B2
(45) Date of Patent: May 1, 2007

(54) CONSTRUCTING HEADS FROM 3D MODELS AND 2D SILHOUETTES

(75) Inventors: Jinho Lee, Columbus, OH (US); Baback Moghaddam, Cambridge, MA (US); Hanspeter Pfister, Arlington, MA (US); Raghu Machiraju, Dublin, OH (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 799 days.

(21) Appl. No.: 10/636,355

(22) Filed: Aug. 7, 2003

(65) Prior Publication Data
US 2005/0031194 A1   Feb. 10, 2005

(51) Int. Cl.
*G06K 9/00* (2006.01)
(52) U.S. Cl. ............... 382/154; 382/118; 382/285; 345/420; 345/653; 345/654
(58) Field of Classification Search .......... 382/103, 382/154, 107, 118, 285, 190, 225, 164, 165, 382/159, 266; 345/419, 420, 473, 441, 421, 345/422, 427, 582, 646, 653, 654; 717/757
See application file for complete search history.

(56) References Cited

U.S. PATENT DOCUMENTS

| | | | |
|---|---|---|---|
| 6,240,198 B1 * | 5/2001 | Rehg et al. ............ | 382/103 |
| 6,795,567 B1 * | 9/2004 | Cham et al. ............ | 382/103 |
| 2003/0007700 A1 * | 1/2003 | Gutta et al. ............ | 382/282 |
| 2003/0051255 A1 * | 3/2003 | Bulman et al. ............ | 725/135 |
| 2004/0104935 A1 * | 6/2004 | Williamson et al. ............ | 345/757 |

OTHER PUBLICATIONS

While Volker et al., (A morphological model for the synthesis of 3D faces, prpceedings of SIGGRAPH 99, Jul. 1999).*
Atick et al., (Statistical approach to shape from shading: reconstruction of 3D face surface from single 2D images, Neural computation, vol. 8, No. 6,pp. 1321-1340, 1996.*
Jebara, et al., "Mixtures of Eigenfeatures for Real-Time Structure from Texture," *Proceedings of ICCV '98*, Jan. 1998.
Lee, et al., "Realistic Modeling for Facial Animations," *Proceedings of SIGGRAPH 95*, pp. 55-62, Aug. 1995.
Rocchini, et al., Multiple Textures Stitching and Blending on 3D Objects. In *Rendering Techniques '99 (Proc. 10th EG Workshop on Rendering)*, pp. 119-130, 1999.
Tarini, et al., "Texturing Faces," *Proceedings Graphics Interface 2002*, pp. 89-98, May 2002.

(Continued)

*Primary Examiner*—Sheela Chawan
(74) *Attorney, Agent, or Firm*—Dirk Brinkman; Clifton D. Mueller; Gene V. Vinokur

(57) ABSTRACT

A method reconstructs or synthesizes heads from 3D models of heads and 2D silhouettes of heads. A 3D statistical model is generated from multiple real human heads. The 3D statistical model includes a model parameter in the form of basis vectors and corresponding coefficients. Multiple 2D silhouettes of a particular head are acquired using a camera for example. The 3D statistical model is fitted to multiple 2D silhouettes to determine a particular value of the model parameter corresponding to the plurality of 2D silhouettes. Then, the 3D statistical model is rendered according to the particular value of the model parameter to reconstruct the particular head.

11 Claims, 7 Drawing Sheets

OTHER PUBLICATIONS

Atick, et al., "Statistical Approach to Shape from Shading: Reconstruction of 3D Face Surfaces from Single 2D Images," *Neural Computation*, vol. 8, No. 6, pp. 1321-1340, 1996.

Szeliski, "Rapid Octree Construction from Image Sequences," *CVGIP: Image Understanding*, vol. 58, No. 1, pp. 23-32, 1993.

Sirovich, et al., "Low dimensional procedure for the characterization of human faces," *Journal of the Optical Society of America A.*, 4:519-524, 1987.

Turk, et al., *"Eigenfaces for Recognition," Journal of Cognitive Neuroscience*, vol. 3, No. 1, 1991.

B. Guenter, C. Grimm, D.Wood, H. Malvar, and F. Pighin. Making Faces. In *Proceedings of SIGGRAPH 98*, pp. 5566, Jul. 1998.

S. Lazebnik and E. Boyer and J. Ponce. On Computing Exact Visual Hulls of Solids Bounded by Smooth Surfaces. *Computer Vision and Pattern Recognition (CVPR'01)*, vol. I, pp. 156-161, Dec. 2001.

W. Matusik, H. Pfister, P. A. Beardsley, A. Ngan, R. Ziegler, and L. McMillan. Image-Based 3D Photography Using Opacity Hulls. In *Proceedings of SIGGRAPH 02*, Jul. 2002.

A. J. O'Toole, H. Abdi, K. A. Deffenbacher, and D. Valentin. Low-dimensional representation of faces in higher dimensions of the face space. *Journal of the Optical Society of America*, vol. 10, No. 3, pp. 405-411, Mar. 1993.

A. Pentland, B. Moghaddam, and T. Starner. View-Based and Modular Eigenspaces for Face Recognition. *IEEE Conference on Computer Vision and Pattern Recognition*, 1994.

P. Ramanathan, E. Steinbach, and B. Girod. Silhouette-based Multiple-View Camera Calibration. In *Proceedings of Vision, Modeling and Visualization 2000*, pp. 3-10, Saarbruecken, Germany, Nov. 2000.

C. Sminchisescu. Consistency and Coupling in Human Model Likelihoods. *IEEE International Conference on Automatic Face and Gesture Recognition*, May 2002.

R. Szeliski and S. Kang. Recovering 3D Shape and Motion from Image Streams Using Non-Linear Least Squares. Technical Report, Robotics Institute, Carnegie Mellon University, Mar. 1993.

Lee et al., "Fast Head Modeling for Animation," *Image and Vision Computing*, vol. 18, No. 4, pp. 355-364, Mar. 2000.

Blanz et al., "A Morphable Model for the Synthesis of 3D Faces," *Proceedings of SIGGRAPH 99*, Jul. 1999.

Pighin et al., "Synthesizing Realistic Facial Expression from Photographs," *Proceedings of SIGGRAPH 98*, Jul. 1998.

Shan et al., "Model-Based Bundle Adjustment with Application to Face Modeling," *Proceedings of ICCV 01*, pp. 644-651, Jul. 2001.

Matusik et al., "Image-Based Visual Hulls," *Proceedings of SIGGRAPH 00*, Jul. 2000.

H. P. A. Lensch, W. Heidrich, and H. Seidel. Automated Texture Registration and Stitching for Real World Models. In *Proceedings of Pacific Graphics '00*, Oct. 2000.

\* cited by examiner

CONSTRUCTING HEADS FROM 3D MODELS AND 2D SILHOUETTES

FIELD OF THE INVENTION

This invention relates generally to image processing, and more particularly to synthesizing heads from 3D models and 2D images.

BACKGROUND OF THE INVENTION

In computer graphics, it is still a fundamental problem to synthetically construct realistic human heads, particularly the face portion. Hereinafter, when referring to 'head' or 'face', the invention is most interested in the portion of the head extending from chin-to-brow, and ear-to-ear. Most prior art methods require either extensive manual labor by a skilled artist, expensive active light 3D scanners, Lee et al., "Realistic Modeling for Facial Animations," *Proceedings of SIGGRAPH* 95, pages 55–62, August, 1995, or the availability of high quality of texture images as a substitute for exact face geometry, see Guenter et al., "Making Faces," *Proceedings of SIGGRAPH* 98, pages 55–66, July 1998, Lee et al., "Fast Head Modeling for Animation," *Image and Vision Computing*, Vol. 18, No. 4, pages 355–364, March 2000, Tarini et al., "Texturing Faces," *Proceedings Graphics Interface* 2002, pages 89–98, May 2002.

More recent efforts have focused on the availability of an underlying model for human faces, see Atick et al., "Statistical Approach to Shape from Shading: Reconstruction of 3D Face Surfaces from Single 2D Images," *Neural Computation*, Vol. 8, No. 6, pages 1321–1340, 1996, Blanz et al., "A Morphable Model for the Synthesis of 3D Faces," *Proceedings of SIGGRAPH* 99, July 1999, Pighin et al., "Synthesizing Realistic Facial Expressions from Photographs," *Proceedings of SIGGRAPH* 98, July 1998, and Shan et al., "Model-Based Bundle Adjustment with Application to Face Modeling," *Proceedings of ICCV* 01, pages 644–651, July 2001.

The model-based approaches make use of the fact that human faces do not vary much in their general characteristics from person to person. Blanz et al. derive an approximate textured 3D face from a single photograph. They require knowledge of rendering parameters, e.g., light direction, intensity, etc., which need to be specified by the user and adjusted by an optimization process. However, texture often increases the uncertainty in the process.

Blanz et al., formulate an optimization problem to reconstruct textured 3D face from photographs in the context of an inverse rendering paradigm. However, their method does not exploit point-to-point correspondence across many faces. Moreover, if the scale of their faces varies across samples, e.g., a baby's face vs. an adult face, only a partial set of points on the larger face is relevant.

A 3D variant of a gradient-based optical flow algorithm can be used to derive the necessary point-to-point correspondence, see Vetter et al., "Estimating Coloured 3D Face Models from Single Images: An Example Based Approach," *Computer Vision—ECCV* '98, Vol II, 1998. Their method also employs color and/or texture information acquired during the scanning process. That approach does not work well for faces of different races or in different illumination given the inherent problems of using static textures.

The application of statistical methods to 3D face geometry is relatively rare and not well explored. Atick et al. recover an eigenhead from a single image by leveraging knowledge of an object class, Modular eigenspaces can be used to recover 3D facial features and their correlation with texture. These can then be used to reconstruct the structure and pose of a human face in the live video sequences, see Jebara et al., "Mixtures of Eigenfeatures for Real-Time Structure from Texture," *Proceedings of ICCV* '98, January, 1998.

A number of methods are known for recovering 3D object shape from 2D object silhouettes that do not depend on color or texture information, see Lazebnik et al., "On Computing Exact Visual Hulls of Solids Bounded by Smooth Surfaces," *Computer Vision and Pattern Recognition (CVPR '01)*, Vol. I, pages 156–161, December 2001, Matusik et al., "Image-Based Visual Hulls," *Proceedings of SIGGRAPH* 00, July 2000, Potmesil," Generating Octree Models of 3D Objects from their Silhouettes in a Sequence of Images," *CVGIP* 40, pages 1–29, 1987, Szeliski, "Rapid Octree Construction from Image Sequences," *CVGIP: Image Understanding*, Vol. 58, No. 1, pages 23–32, 1993, and Zheng, "Acquiring 3D Models from Sequences of Contours," *IEEE Transactions on Pattern Analysis and Machine Intelligence*, Vol. 16, No. 2, February 1994.

The reconstructed 3D shape is called a visual hull, which is a maximal approximation of the object consistent with the object's silhouettes. The accuracy of this approximate visual hull depends on the number and location of the cameras used to generate the input silhouettes. In general, a complex object such as human face does not yield a good shape when a small number of cameras are used to approximate the visual hull. Moreover, human faces possess numerous concavities, e.g., the eye sockets and the philtrum, which are impossible to reconstruct even in an exact visual hull due to its inherent limitation.

However, if there exists inherent knowledge of the object to be reconstructed, then this knowledge can be used to constrain the silhouette information to recover the shape of the object. For example, an optimal configuration of human motion parameters can be searched by applying a silhouette/contour likelihood term, see Sminchisescu, "Consistency and Coupling in Human Model Likelihoods," *IEEE International Conference on Automatic Face and Gesture Recognition*, May 2002. Internal and external camera parameters can be recovered using exact information of an object and its silhouette images, see Lensch et al., "Automated Texture Registration and Stitching for Real World Models," *Proceedings of Pacific Graphics* '00, October 2000.

Therefore, there is a need for a system and method that can reconstruct faces from 3D shape models and 2D images.

SUMMARY OF THE INVENTION

The invention uses a model-based approach to synthesize accurate 3D human 'head' geometry from 2D images. The model according to the invention is not synthetic but is based on real human faces measured by laser-based cylindrical scanners. The data-driven model is only limited in its expressive power by the number and variety of the heads in the database.

The model can be easily expanded by incorporating new faces into the database. Instead of deriving an approximate textured 3D face from a single photograph, as in the prior art, the invention acquires relatively accurate geometry of a face from multiple silhouette images.

Silhouettes separate geometric subtleties of the human head from the nuances of shading and texture. As a consequence, the invention does not require knowledge of rendering parameters, e.g., light direction, intensity, as in the prior art.

The use of geometry for head synthesis is supported by a diverse data set, across age, gender, and race, anthropometric, and hence structural variations that best classify various faces.

Another motivation to use silhouette images rests on the assumption that a set of carefully chosen viewpoints generates a unique sequence of silhouettes for each individual. Therefore, the silhouette images are sufficient to recover an optimal face in a measure-based head space.

The invented method reconstructs human heads from silhouettes in a robust and efficient manner, even when presented with partial information of the human head. The automated method requires only a few user-specified parameters. The invention also provides a novel process for establishing correspondence between two heads. The invention uses an efficient error metric, i.e., a boundary weighted XOR, for optimization. In addition, the invented method is resolution-independent enabling expedient reconstructions of human faces.

DETAILED DESCRIPTION OF THE PREFERRED EMBODIMENT

Method Overview

Figure 1:
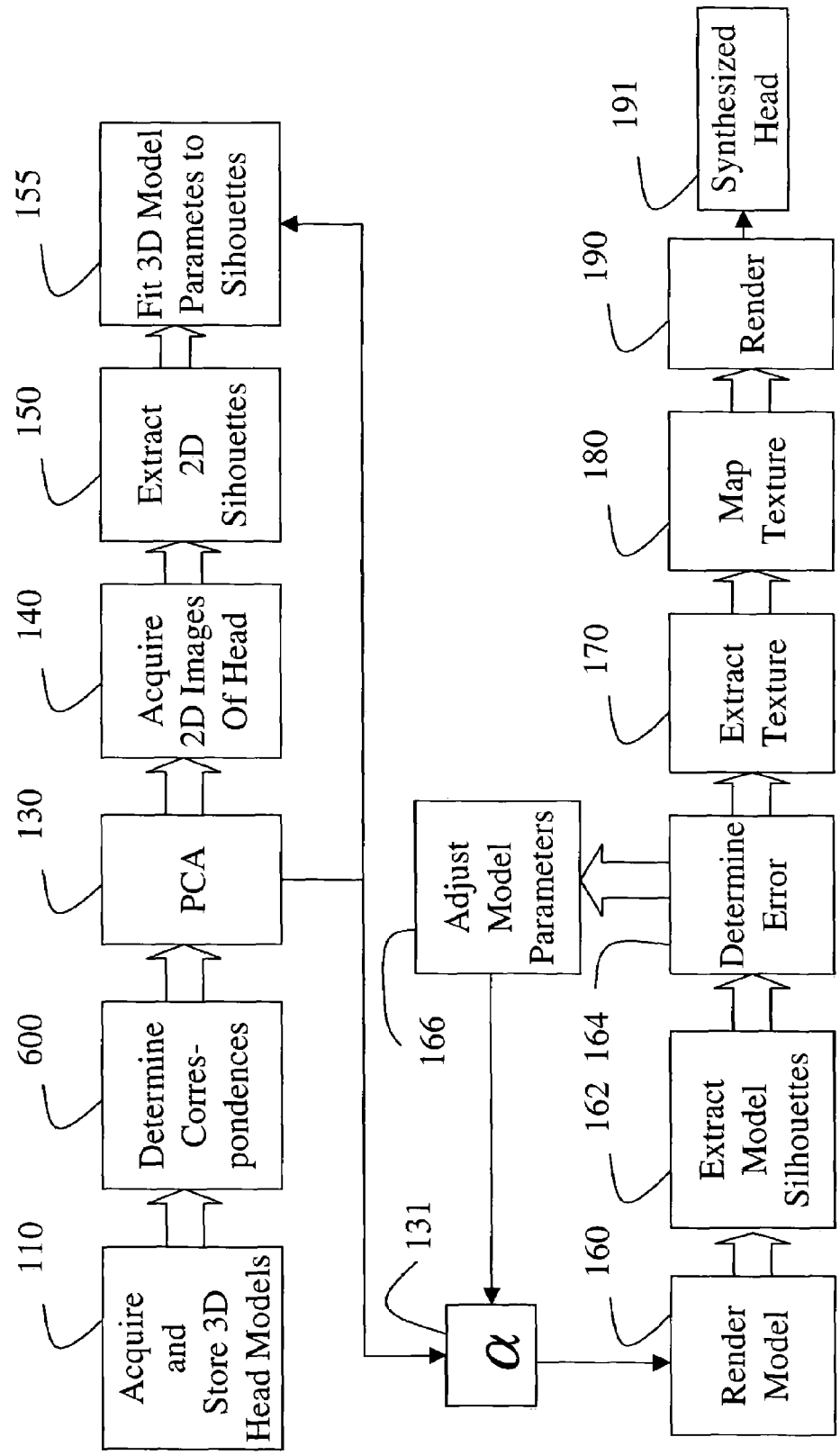
FIG. 1 is a flow diagram of a method for synthesizing new heads from 3D models of faces and 2D silhouettes of acquired images according to the invention.

FIG. 1 shows a method 100 for synthesizing heads from 3D models and 2D silhouettes according to the invention. As stated before, by 'head' we means the face portion from chin to brow, and ear to ear.

In step 110, a large number of 3D geometric models of heads are acquired and stored in a database. The geometric models can be acquired by any number of known techniques, e.g., laser scanning, 3D scanning (NMR, CAT, MRI), and the like. The geometric models can be represented in the form of, for example, polygon meshes, discrete sample points, distance fields, and the like. The faces can vary as to age, gender, and race for different individuals.

In step 600, multiple correspondences between the 3D geometric models are determined by identifying like geometric feature on the various models, e.g., features on the nose, eyes, eyebrows, ears, mouth, brow and chin.

Principal component analysis (PCA) applied 130 to the correspondences determine basis vectors and a vector of coefficients ($\alpha$) 131 of a 3D statistical head model.

PCA is a statistical method to extract the most salient directions of data variation from large multi-dimensional data sets. Typically, the data sets are measured from real world phenomena or objects. The basis vectors parameterize the model of the head.

Low dimensional representation using PCA is a popular method for the synthesis and recognition of objects, such as faces, in 2D images, see Craw et al., "Face Recognition by Computer,: *British Machine Vision Conference* 1992, pages 498–507, 1992, Jolliffe, "*Principal Component Analysis,*" Springer-Verlag, N.Y., 1986, O'Toole et al., "Low-dimensional representation of faces in higher dimensions of the face space," *Journal of the Optical Society of America*, Vol. 10, No. 3, pages 405–411, March 1993, Pentland et al., "View-Based and Modular Eigenspaces for Face Recognition," *IEEE Conference on Computer Vision and Pattern Recognition*, 1994, Sirovich et al., "Low dimensional procedure for the characterization of human faces," *Journal of the Optical Society of America* A., 4:519–524, 1987, and Turk et al., "Eigenfaces for Recognition," *Journal of Cognitive Neuroscience*, Vol. 3, No. 1, 1991.

The application of PCA to 3D face geometry is relatively rare and not well explored. Atick et al., see above, describe a method for using eigenheads to solve shape from shading problem by leveraging the knowledge of object class, which was used to recover the shape of a 3D human face from a single photograph. Jebara et al., above, used modular eigenspaces for 3D facial features and their correlation with the texture to reconstruct the structure and pose of a human face in live video sequences.

The parameters of the 3D statistical model according to the invention can be used to synthesize (render) 160 new or existing faces by linear combinations of the eigenheads, as follows.

In step 140, 2D images of head are acquired from multiple viewpoints. The images can be acquired by one or more still or video cameras. Alternatively, the 2D image can be a rendering from a 3D model, for example, any of the models stored in the database. From the acquired images, silhouettes are extracted 150, using well known techniques, e.g., binary background subtraction.

In either case, the silhouettes are aligned 155 with the 3D models in the database because rotations R and translations T of the acquired images are not known. The alignment to estimate R and T can be done manually by 'clicking' on face features in the acquired images, or by computer vision techniques, e.g., an automatic pose estimator.

Now, it is possible to render 160 one of the stored models with corresponding alpha coefficients 131 using R and T for each of the viewpoints corresponding to the 2D images. The alpha coefficients are the weights by which each PCA basis vector is multiplied to make up the new eigenhead.

Silhouettes are extracted 162 for each viewpoint from these images. We will call these 'eigenspace silhouettes' to distinguish them from the silhouettes extracted from the acquired 2D images. The eigenspace silhouettes are compared with the actual 2D silhouettes to determine 164 an error. The error function can be a boundary weighted exclusive OR (XOR) function. Then, the alpha coefficients 131 of the eigenhead are adjusted 166 so that the error is minimized. A downhill simplex process can be used for this minimization. The result is that the vector alpha $\alpha$ 131 generates 160 a new eigenhead that matches the acquired silhouettes best according to the error criterion.

Texture can now be extracted 170 and mapped 180 to the new eigenhead, and the textured eigenhead can be rendered 190 as a 2D image 191 of a 'synthetic' face for any arbitrary viewpoint.

Our invention models a human head as a member of a low dimensional 3D head space. The model is obtained by applying eigen-analysis to point-to-point correspondence among 3D heads. The invention applies principal component analysis (PCA) to a database of 3D geometries of human heads. As a consequence, we define face geometries with eigenheads. The PCA can be used to reconstruct a new or existing head through a linear combination of our eigenheads.

Head Model

Our head model is $$H(\alpha) = \text{mean} + \sum_{m=1}^{M} \alpha_m h_m, \quad (1)$$

where the model parameter $\alpha = \{\alpha_1, \alpha_2, \ldots, \alpha_M\}$, and $h_m$ is the $m^{th}$ eigenhead.

Figure 2:
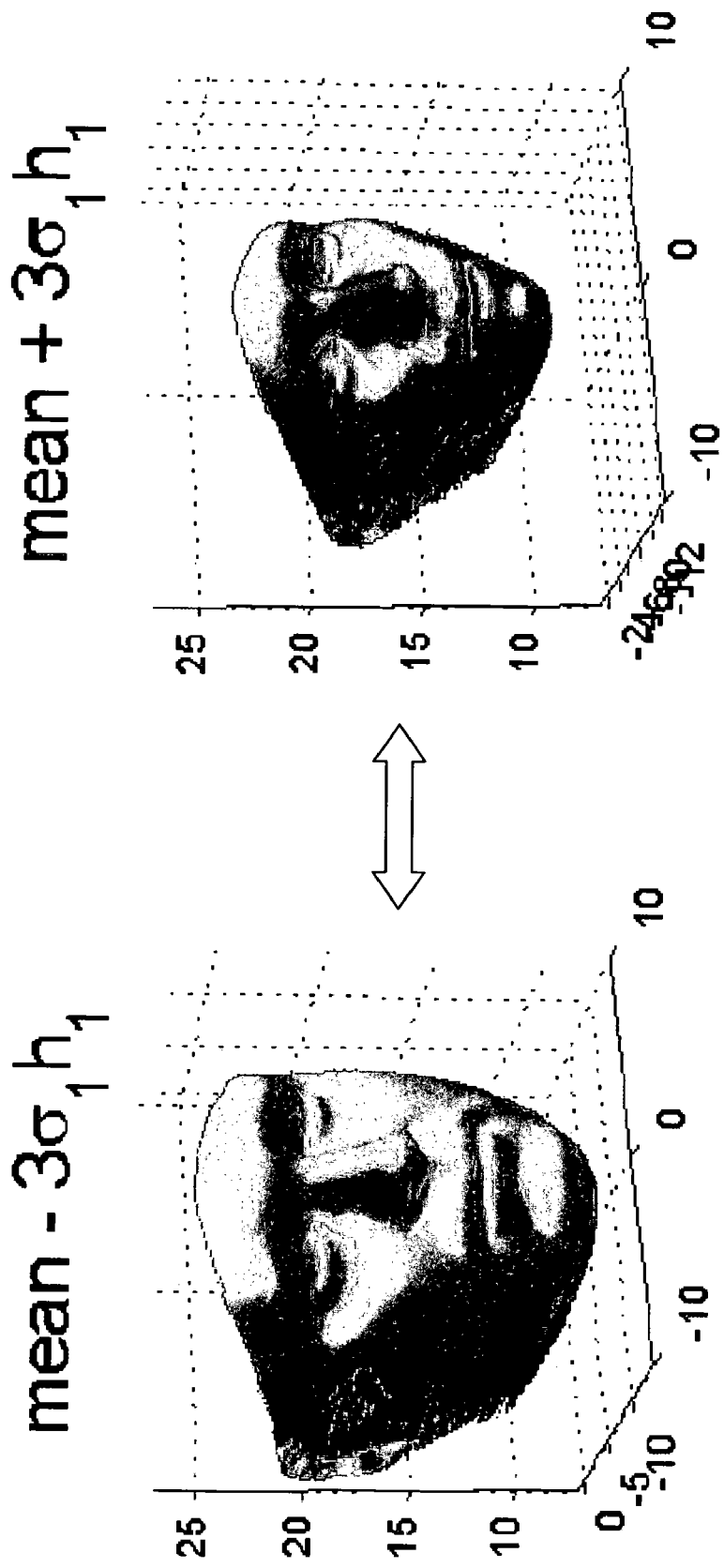
FIG. 2 shows variation in overall scale correlated with gender information for eigenheads according to the invention.
Figure 3:
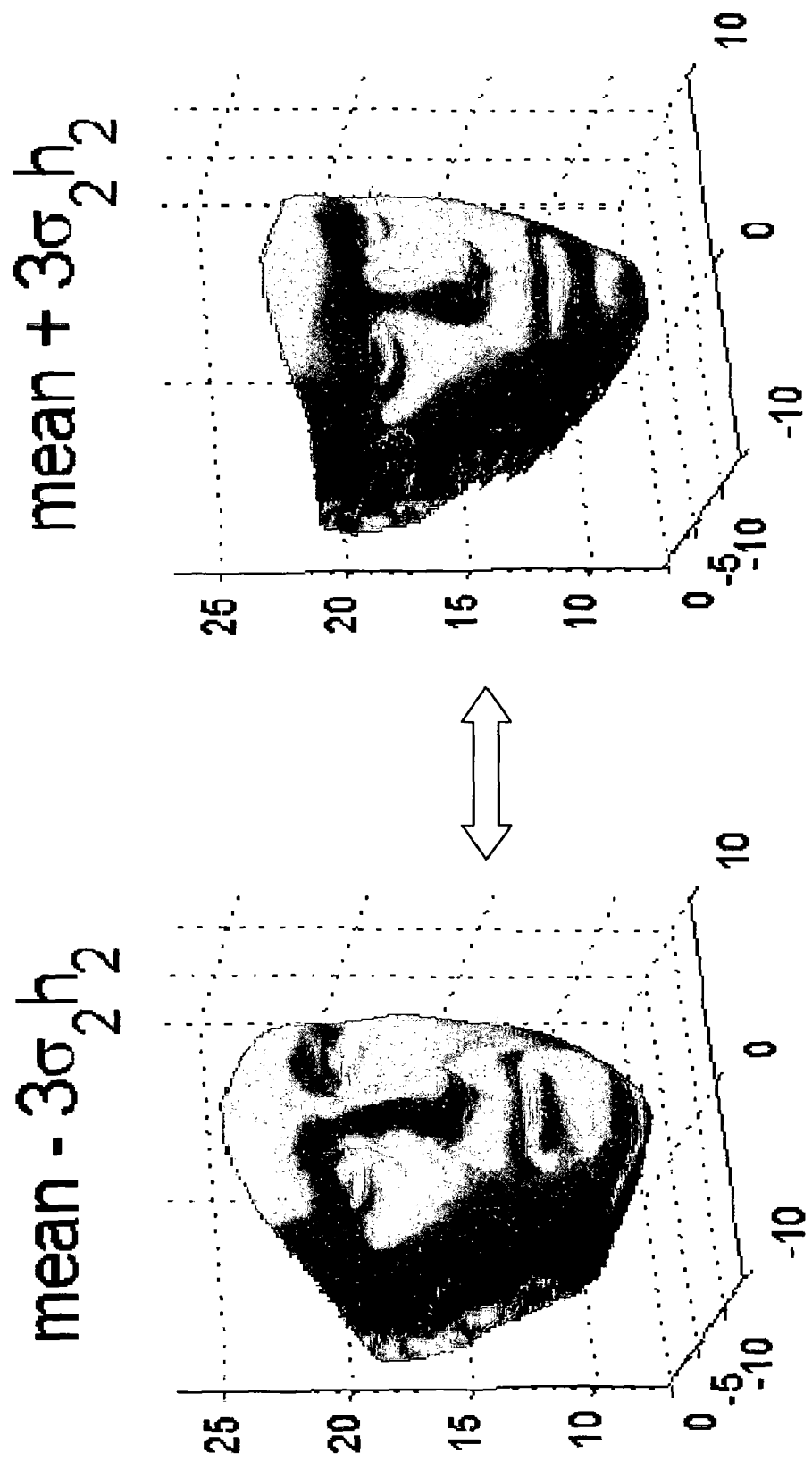
FIG. 3 shows variation in the shape of chin for eigenheads according to the invention.
Figure 4:
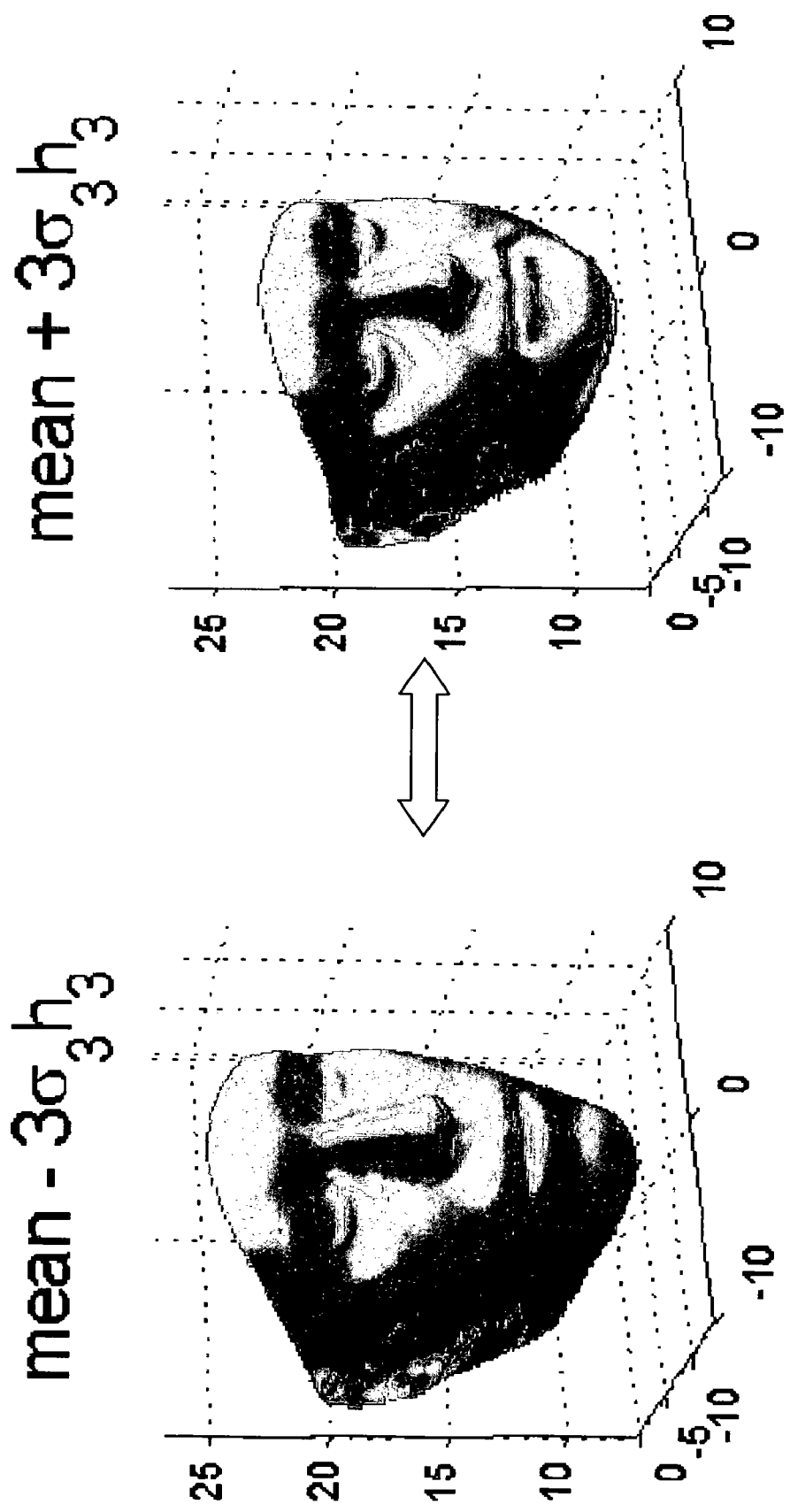
FIG. 4 shows variation in the length of faces for eigenheads according to the invention.
Figure 5:
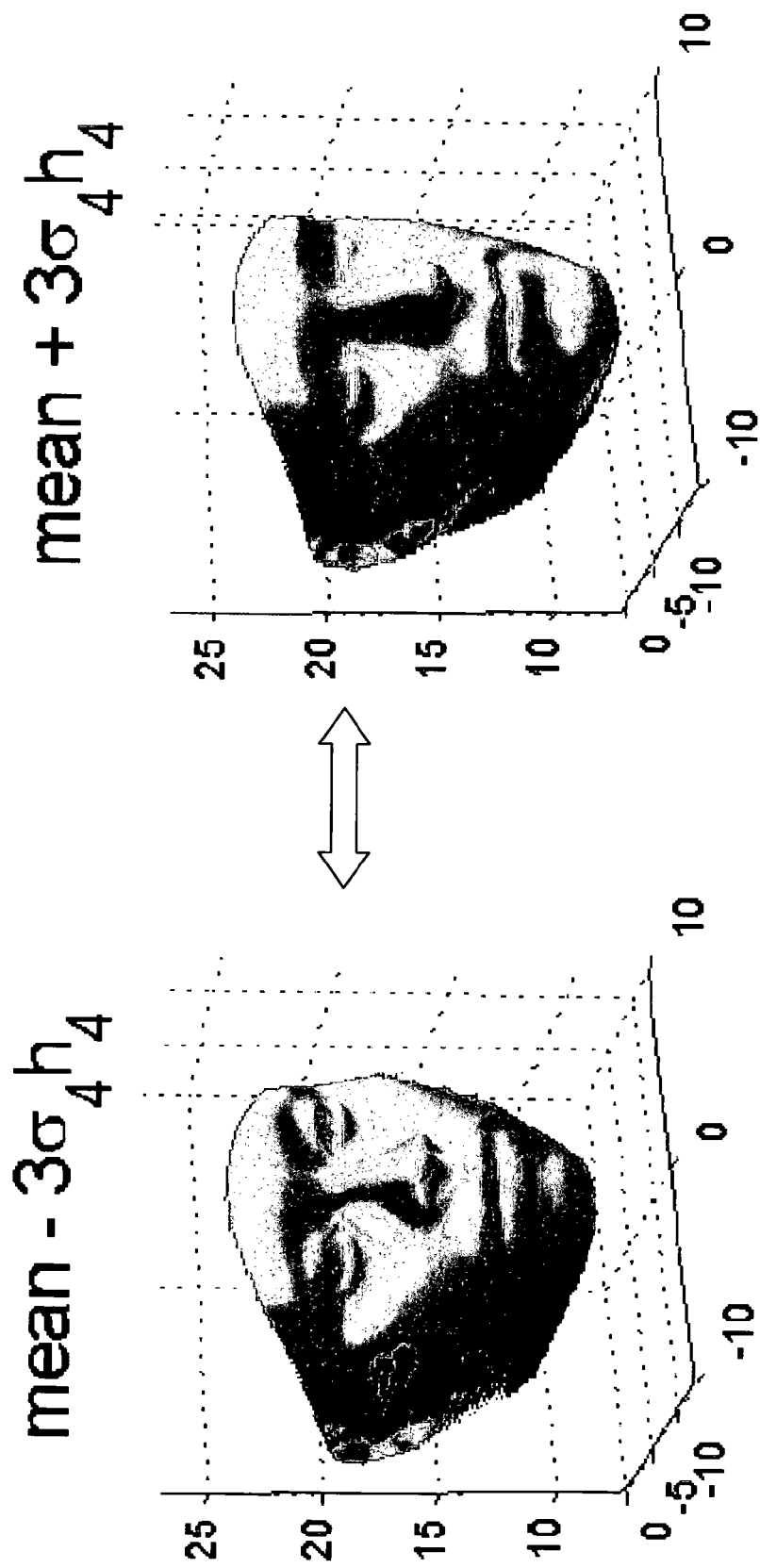
FIG. 5 shows variation in race for eigenheads according to the invention.
Figure 6:
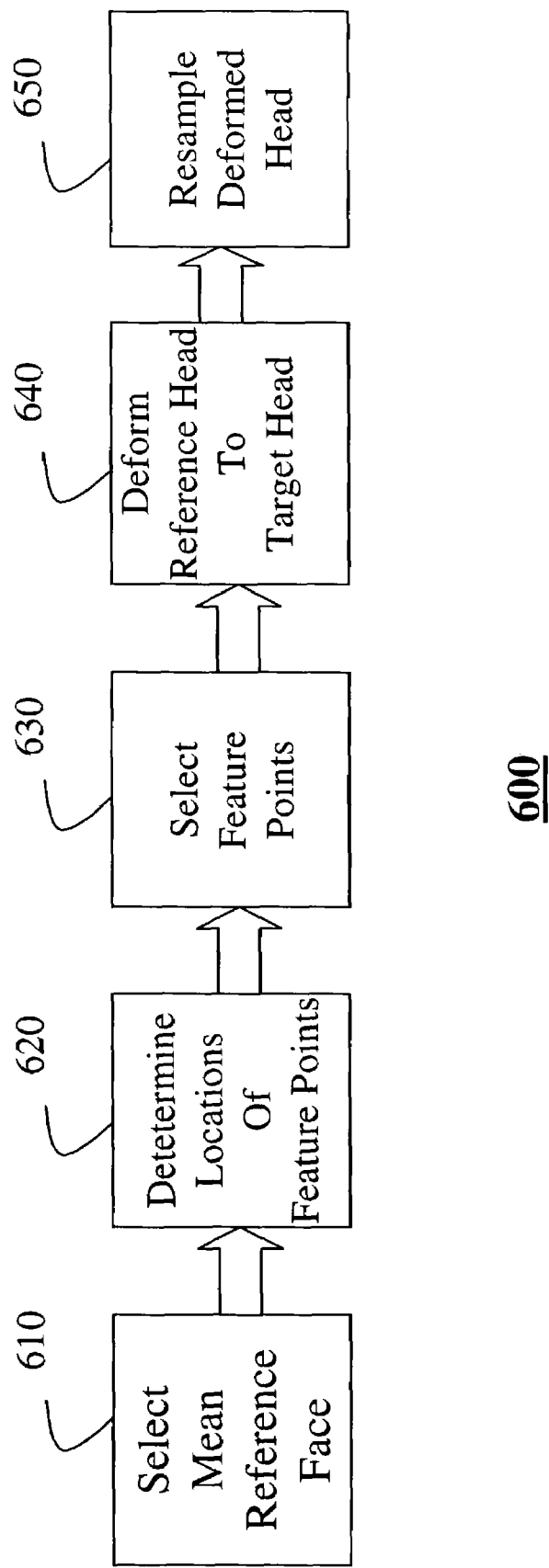
FIG. 6 shows steps of determining features correspondences for eigenheads according to the invention.

FIG. 2 show a variation in overall scale, correlated with gender information, of our eigenheads. FIG. 3 shows variation in the shape of chin, FIG. 4 shows variation in the length of faces, and FIG. 5 shows variation in race for different individuals.

Correspondence

To obtain feature point-to-point correspondences, we acquire and store 3D models in a model database as $M_i$, for $i=1, \ldots, N$. Because the number of feature points ($F_i$) in the models $M_i$ vary, we resample all models so that they have the same number of points, all in mutual correspondence. This enables correspondence in feature points across all models $M_i$. In other words, the tip of the nose of model $M_i$ is mapped to the tip of the nose of model $M_j$, and so on.

We define the set of feature points in a model $M_i$ as $Q_i = \{q_{i,1}, q_{i,2}, \ldots, q_{i,m}\}$, where m is the number of feature points and $q_{i,j}$ is the index for a specific feature point. The location of a feature point k in Cartesian coordinate space is $q_{i,k} = (x, y, z)$.

Then, the problem of deriving full correspondence for all models $M_i$ is a resampling of the F features for all $M_i$ faces, under the constraint $q_{i,k} = q_{j,k}$, where $I \neq j$ for all i, j and k.

FIG. 600 shows method steps for determining the correspondences. Select 610 a reference model $M_r$, which is a 'closest' head to the mean face in the database. Determine 620 locations of feature points. Select 630 $f$ feature in each model $M_i$ manually. Deform 640 the reference model $M_r$ so that it fits each target model $M_i$. This requires an interpolation of all points in reference model $M_r$ under the constraint $q_{r,k} = q_{i,k}$. The deformed model is $M^d_i$. Now, the deformed model $M^d_i$ has a shape similar to the reference model $M_i$ because all m feature points have the same location. As stated above, each deformed model $M^d_i$ has exactly the same number of features as the reference model $M_r$.

For each feature in the deformed model $M^d_i$, sample 650 a point on the surface of $M_i$, in the direction of underlying cylindrical projection, as defined by the scanner configuration.

The resulting resampled point set is $M^s_i$, which satisfies the constraints on the feature locations $q_{r,k} = q^s_{i,k}$, and $q_{i,k} = q^s_{i,k}$. Repeat steps 640 and 650 for all target model $M_i$'s in database, where $i \neq r$.

Any standard process for scattered data interpolation can be exploited in step 640, e.g., see Nielson, "Scattered Data Modeling," *IEEE Computer Graphics and Applications*, Vol. 13, No. 1, pages 60–70, January 1993.

It may not be possible to obtain corresponding samples on the surface of face $M_i$ for some points on the boundary of the deformed face $M^d_i$. It is likely that the two faces under consideration do not match exactly on the boundary. We keep track of the indices of those void sample points and use only sample points whose indices are not void in any resampling of face $M_i$ in the database.

Fitting Model Parameters to Silhouette Images

We now describe how we fit model parameters to a set of input silhouette images. Generally, this fitting process does not require a specific face model. A novel weighted silhouette contour cost is described below. We also described an optimization strategy that depends on the underlying face model. We describe how our face model and database is adapted to a specific non-linear multidimensional optimization algorithm.

Problem Formulation

Let $M(\alpha)$ be any arbitrary face model, which produces a polygon mesh given the vector parameter $\alpha = \{\alpha_1, \alpha_2, \ldots, \alpha_n\}$ 131. Let $S^k$, for $k=1, \ldots, K$ be an input silhouette image acquired 140 by a camera $C^k$. Let T be a similarity transformation that aligns a reference model face to the real 3D face.

Then, $S^k_m(\alpha)$ is a silhouette image rendered by projecting $T(M(\alpha))$ onto an image plane using the calibration information of the given camera $C_k$. Steps for determining this transformation is described below.

Provided we define a cost function $f$ that measures a difference between two silhouette images, our goal is to find $\alpha$ that minimizes $$E(\alpha) = \sum_{k=1}^{K} f(S^k, S^k_m(\alpha)). \quad (2)$$

Solving Alignment Problem

Finding the alignment transformation T is not trivial using only the silhouette information. The form of the transform T depends on the pose (location and orientation) and size (scale) of the acquired face. The transform T can be defined as $$T(x) = s(Rx+t),$$

where s is a scale factor, R is a rotation matrix, and t is a translation vector. The alignment problem is then one of minimization of a functional i.

$$\sum_{j=1}^{L} \|x_j - T(y_j)\|^2,$$

in terms of s, R and t. It should be noted that $x_j$ is the $j^{th}$ 3D feature point in a real head, $y_j$ is the $j^{th}$ 3D feature point in a reference head model and L is the number of feature points to be used.

We already know $y_j$. However, $x_j$ is determined from a standard non-linear least square minimization technique. A 2D correspondence problem among L feature points in a small number of (3–4) texture images is solved using for example, techniques described by Press et al., "*Numerical Recipes in C: The Art of Scientific Computing*," Cambridge University Press, New York, 1988, and Szeliski et al., "Recovering 3D Shape and Motion from Image Streams Using Non-Linear Least Squares," *Technical Report*, Robotics Institute, Carnegie Mellon University, March, 1993.

After we determine $x_j$, we determined the values of s, R and t such that Equation (3) is minimized. The needed parameters are obtained from an application of the full ordinary Procrustes analysis as described by Dryden et al., *"Statistical Shape Analysis,"* John Wiley & Sons, New York, 1998.

Partial Silhouette Matching

Now, we described the cost function $f$ in Equation (2). The easiest way to measure difference of two binary images is to count the number of 'on' pixels when a pixel-wise XOR operation is applied to the two images, see Lensch et al., above.

In this case, $$f(S^k, S_m^k(\alpha)) = \sum_i^H \sum_j^W c(i, j), \text{ where} \quad (4)$$

$$c(i, j) = \begin{cases} 0 & \text{if } S^k(i, j) = S_m^k(\alpha)(i, j) \\ 1 & \text{otherwise} \end{cases}.$$

If our goal requires that $f=0$, that is, if two silhouettes overlap exactly, then the optimal solution is unique in terms of $S_m^k(\alpha)$. However, if our objective function $f$ cannot be reduced to zero, given inherent characteristics of the problem, then it is likely that there are multiple optimal solutions. Any preference among those multiple optimal solutions can be incorporated in the cost function.

In our case, the input silhouette area covers the full head including hair and the back, while our face model includes the front 'facial' portion delineated by the ears on the sides, the brow at the top, and chin at the bottom. Thus, our objective function, $f$, is often non-zero, or $f>0$), because the silhouette generated by our model ($S_m^k(\alpha)$) considers only a partial area of the input silhouette ($S^k$).

If we use the objective function $f$ in Equation(4), then we can have multiple set of $Sk_m^k(\alpha)$ that minimize $f$, and we cannot guarantee that these solutions match the real boundary contours in the input silhouettes. Our goal is to match the real boundary contours between input and model silhouettes, and the cost function $f$ is required to be a global minimum. Accordingly, we impose a higher penalty for a mismatch near the boundary pixels of input silhouettes.

Though a mismatch in the pseudo contour area contributes a higher cost to $f$, this contribution can be considered as a constant factor. Our new cost function replaces $c(i, j)$ in Equation (4) with $$c(i, j) = \begin{cases} 0 & \text{if } S^k(i, j) = S_m^k(\alpha)(i, j) \\ \dfrac{1}{d(i, j)^2} & \text{otherwise} \end{cases}, \text{ where}$$

$$d(i, j) = D(S^k)(i, j) + D(\tilde{S}^k)(i, j),$$

and where $D(S)$ is the Euclidean distance transform of binary image S and $\tilde{S}$ is the inverse image of S. Note that d represents a distance map from silhouette contour and can be computed once in a preprocessing step.

We call this cost function a boundary-weighted XOR, which provides a simple and effective alternative to precise contour matching schemes. As a result, there is no need for expensive operations of correspondence, edge-linking, curve-fitting, distance computations between boundary curves, as is the case when precise prior art contour matching schemes are used. Thus, our optimization algorithm is fast and robust.

Optimization

To minimize Equation (2), we use a downhill simplex method, which requires only function evaluation. Downhill simplex methods applied in other art fields are well known, see Lensch and Press above. The optimization parameter is the model parameter $\alpha$ 131. One function evaluation includes the following steps:

a) Compute a mesh G from $M(\alpha)$.
b) Compute an aligned mesh T(G).
c) For each input silhouette $S^k$, Project T(G) into $k^{th}$ image plane and generate silhouette image $S_m^k$.

ii) Compute XOR between $S^k$ and $S_m^k$, and add it to the total cost.

This optimization process depends on the characteristics of the model parameter $\alpha$. Here, we describe the optimization process based on our eigenhead model parameter described above.

We select a number of eigenheads, e.g., 60 eigenheads to reconstruct a 3D model. This number is sufficient to capture most of the salient features in a human face. Thus, the corresponding coefficients serve as our multi-dimensional optimization parameter of dimensionality 60.

We adapt the downhill simplex method to our multi-dimensional head model. The initial simplex of 60 dimensions consists of 61 vertices. Let the coefficients $\alpha = \{0, \ldots, 0\}$, corresponding to the mean head, be one of the initial points $p_0$ of the simplex. We can select the other remaining 60 points to be $$p_i = p_0 + \mu_i e_i, \text{ for } i=1, \ldots, 60,$$

where the $e_i$'s are 60 unit vectors, and $\mu_i$ is defined by the characteristic length scale of each component of $\alpha$. We set $\mu_i = 3\sqrt{\lambda_i}$, where $\lambda_i$ is the $i^{th}$ eigenvalue corresponding to $i^{th}$ eigenhead in our model.

With this initial configuration, the movement of this 60 dimensional simplex is confined to be within our face space. Thus, there is no need to perform exhaustive searches in the exterior of the model space.

Another noteworthy aspect of our optimization procedure in the selected model space is that it is resolution-independent. This allows for very expedient reconstruction and synthesis.

Although, the downhill simplex method has slow convergence properties, the choice of the error metric can improve its efficiency significantly. The choice of our boundary-weighted XOR error metric is very beneficial given its low cost and simplicity.

Texture Extraction

Our optimized 3D model matches all acquired silhouette images as close as possible. Because the acquired silhouette images are obtained from the corresponding texture images, we do not need any further registration process for texture extraction. We extract texture colors in object space, rather than image space, and do not generate a single texture map image.

That is, for each 3D vertex in the synthetic 3D head, we assign a color value that is determined from multiple texture images. To do so, we proceed as follows. Our approach is a view-independent texture extraction approach. Each vertex is projected to all image planes, and the projected vertex is tested to determine if the projected location is within the silhouette area and whether the vertex is visible, i.e., not occluded, at each projection.

For all valid projections, we compute a dot product between the vertex normal and the viewing direction, and use the dot product as a weight of the texture color sampled at the projected image location. The final color value at a vertex is computed by dividing the weighted sum of texture values of all valid projections by the sum of weights.

Implementation Issues

One concern is the speed of the optimization process. In a function evaluation, the most time-consuming part is the silhouette generation. Because our head model has a very high resolution, e.g., approximately 48000 vertices and 96000 triangles, even rendering with flat shading takes considerable time, should the rendering be repeated in an optimization process.

A simple solution for this problem reduces the mesh resolution by vertex decimation. Also, if we reduce the mesh resolution, then it is natural to reduce the resolution of silhouette images accordingly. The reduction in model and image resolution accelerates the XOR computation process. A 95% decimation in the mesh and 50% reduction in image resolution results has a similar convergence rate and a lower, e.g., one tenth the cost of that required for original resolution data. With this reduced resolution data, the total optimization takes about three minutes on an Intel Pentium IV, 2 GHz class microprocessor.

Note that this reduction in input data resolution does not affect the resolution or quality of the final output image 191. After we estimate the optimal coefficients, we can synthesize a 3D head at a full resolution from the stored eigenheads using Equation (1).

The optimization process can be further accelerated by employing a hierarchical approach. With more reduced resolution, we can obtain an approximation of the solution that can be achieved with original resolution data in even lesser time. For example, with 99% decimation in mesh resolution and a 75% reduction in image resolution, convergence can be obtained in a fraction of a minute. Thus, we can provide a low-resolution result as an initial guess for a high-resolution optimization. As a result, better results can be obtained, in a shorter time, than those obtained using only high-resolution data.

The degree of resolution-independence built into our scheme is a very desirable feature. Our statistical shape model captures fine details, as being correlated with coarser ones, which allows us to use lower-resolution sensing in the input images and low-resolution XOR computations for shape recovery.

Synthetic Data

We can also directly derive synthetic data from our face model space to construct 'new' faces.

Camera Arrangement

As for a visual hull method, it is important to select the camera viewpoints carefully to obtain maximal 3D information from a set of silhouette images.

Figure 7:
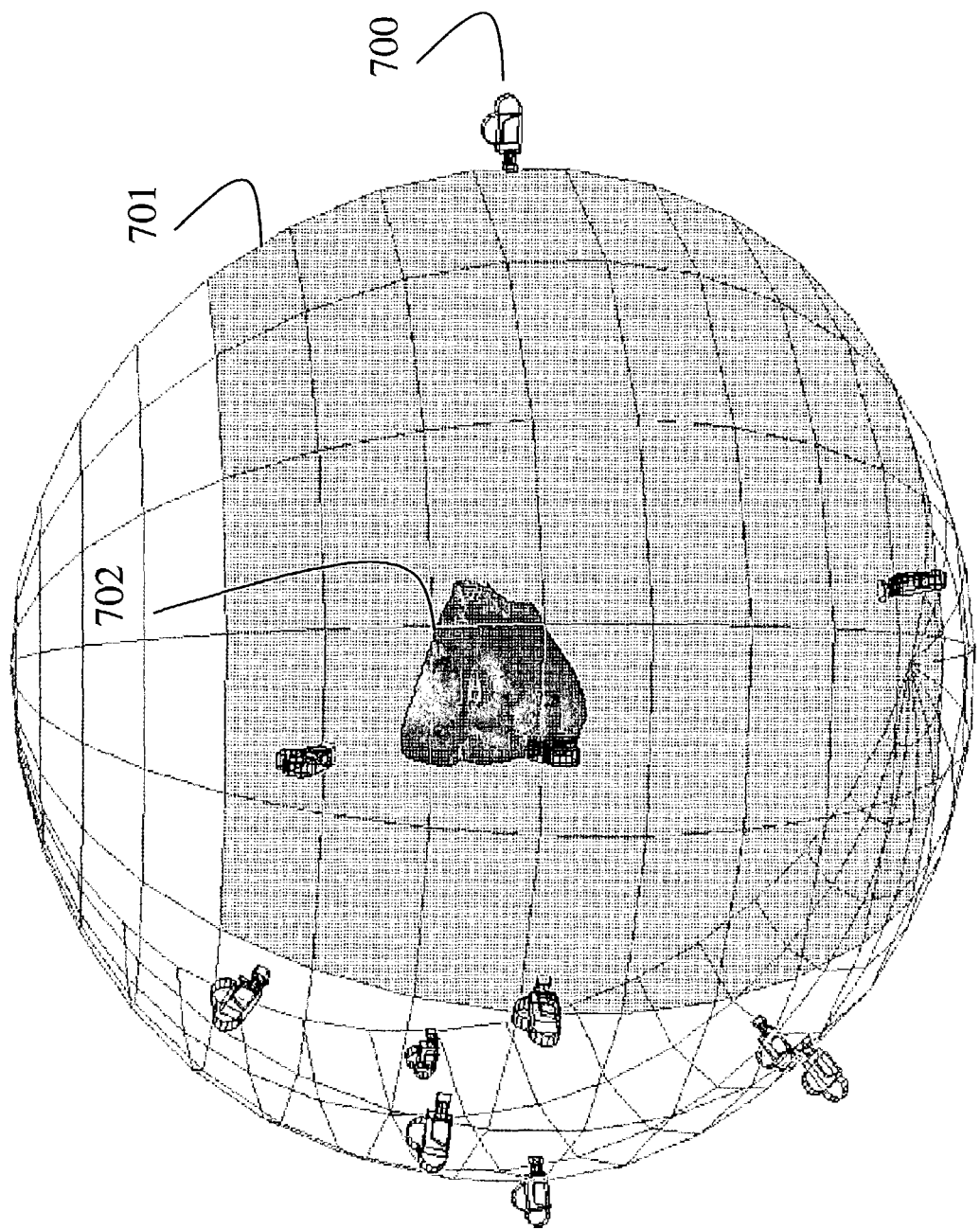
FIG. 7 shows camera placement for acquiring 2D images according to the invention.

As shown in FIG. 7, eleven cameras can be placed on a frontal hemisphere 701 around a target head 702. The placement of the cameras determines the size of the portion of the head that is modeled.

Real Data

The challenges in using images taken by cameras include the issues of silhouette acquisition, accuracy of camera parameters, misalignment, and clutter, excess areas of the head outside the model. We assume that silhouette images can be easily acquired by a simple background subtraction technique as known in the art.

We calibrated the eleven static cameras by a standard camera calibration technique using a calibration object. One can enhance this initial camera calibration by a technique that uses silhouette images. The effects of clustering can be avoided by the design of a suitable cost function based on the boundary-weighted XOR error metric as described above.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for synthesizing heads from 3D models of heads and 2D silhouettes of heads, comprising:

generating a 3D statistical model from a plurality of heads, the 3D statistical model including a model parameter;

acquiring a plurality of 2D silhouettes of a particular head;

fitting the 3D statistical model to the plurality of 2D silhouettes to determine a particular value of the model parameter corresponding to the plurality of 2D silhouettes; and rendering the 3D statistical model according to the particular value of the model parameter to reconstruct the particular head.

2. The method of claim 1 wherein the generating further comprises:

generating a plurality of 3D geometric models of the plurality of faces;

determining correspondences of like features in the 3D geometric model;

applying principal component analysis to the correspondences to determine basis vectors and a corresponding vector of coefficients to be used as the model parameter.

3. The method of claim 2 wherein the 3D geometric models are in the form of polygon meshes.

4. The method of claim 1 wherein the faces vary as to age, gender, and race for different individuals.

5. The method of claim 2 wherein the 3D statistical model is $$H(\alpha) = \text{mean} + \sum_{m=1}^{M} \alpha_m h_m,$$

where a value $\alpha = \{\alpha_1, \alpha_2, \ldots, \alpha_M\}$, and $h_m$ is an $m^{th}$ eigenhead, and mean is a mean statistical model.

6. The method of claim 1 further comprising:

acquiring the plurality of 2D silhouettes from a plurality of viewpoints;

generating a corresponding eigenspace silhouette for each corresponding viewpoint from the 3D statistical model;

determining an error between the plurality of 2D silhouettes and the corresponding eigenspace silhouettes; and minimizing the error to determine the particular value of the model parameter.

7. The method of claim 6 wherein the error is determined by on exclusive OR operation on each 2D silhouette and corresponding eigenspace silhouette.

8. The method of claim 7 wherein the exclusive OR is weighted according to a boundary of the corresponding eigenspace silhouette.

9. The method of claim 6 wherein the error is minimized using a cost function.

10. The method of claim 9 wherein the cost function is optimized using a downhill simplex method.

11. The method of claim 1 further comprising:
acquiring 2D images of the particular face;
extracting texture from the 2D images;
mapping the texture to the 3D statistical model.

* * * * *